Aug. 7, 1962 B. C. KLINT 3,048,447
TOY WHITE SIDE WALL TIRE
Filed Aug. 5, 1960
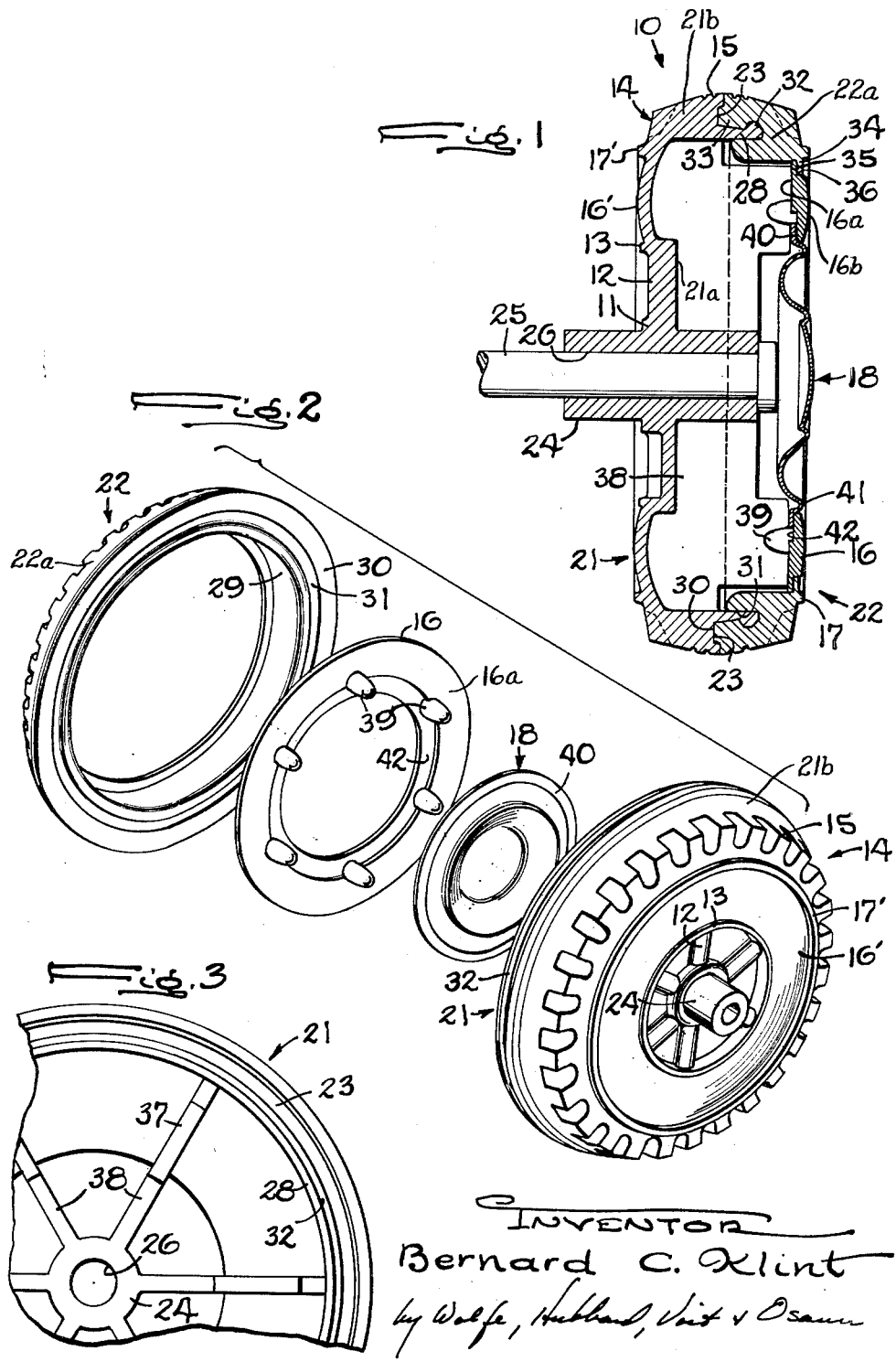
INVENTOR
Bernard C. Klint
by Wolfe, Hubbard, Voit & Osann
ATTORNEY 3,048,447
TOY WHITE SIDE WALL TIRE
Bernard C. Klint, Rockford, Ill., assignor to Ny-Lint Tool & Mfg. Co., Rockford, Ill., a corporation of Illinois
Filed Aug. 5, 1960, Ser. No. 47,731
8 Claims. (Cl. 301—63)

The present invention relates to a wheel for toy vehicles and more particularly to a toy wheel simulating the appearance of a conventional wheel with a tire mounted thereon.

The primary object of the invention is to provide a wheel of the above character which as compared to former wheels of this type is easier to construct and more closely resembles a conventional wheel and tire.

Another object is to construct the wheel from a number of easy-to-form parts which may be assembled easily and locked in place by merely pressing the parts together.

Still another object is to construct the wheel so that the parts may be made of different materials to resemble an actual wheel with a white side wall tire.

Other objects and advantages of the invention will become apparent from the following detailed description taken in connection with the accompanying drawings, in which:

FIGURE 1 is a sectional view of a toy wheel embodying the novel features of the present invention.

FIG. 2 is an exploded perspective view of the wheel.

FIG. 3 is a fragmentary plan view of the inner member of the wheel.

The present invention is shown in the drawings for purposes of illustration embodied in a wheel 10 for use on a toy vehicle (not shown). The wheel 10 is constructed to simulate a commercial wheel having a hub 11, a spoke portion 12, a rim 13 supported by the spoke portion and a tire 14 mounted on the rim. The tire 14 includes a tread 15 or ground engaging porton and inner and outer side walls 16' and 16 separated from the tread by beads 17' and 17. At the outer side of the wheel, the hub 11 and spoke portion 13 are concealed behind a wheel cover disk 18 or so called hub cap. The outer side wall 16 of the tire 14 may be a different color than the rest of the tire, usually the outer side wall being white and the rest of the tire black.

In accordance with the present invention, the wheel is constructed in a novel manner from simple, easily formed parts assembled into a unitary structure by merely snapping two individual parts together and thus clamping other parts in place. To these ends, locating means are formed on the various component parts of the wheel to position the parts relative to each other and resilient locking means are formed on the two individual parts which snap together. With this construction, the various parts of the wheel may be made from different materials to resemble more closely a commercial wheel. Thus, the wheel and tread portion of the tire may be formed of one material, the white side wall from another, and the wheel cover from yet another.

In the present instance, the wheel 10 includes inner and outer members 21 and 22 adapted to be joined together along a plane extending transversely of the axis of the wheel and passing through the tread 15 of the tire 14. The member 21 is molded or stamped in a dish shape to constitute approximaely one-half of the wheel 10 and has an end wall 21ᵃ and a cylindrical wall 21ᵇ which extends axially from the end wall and terminates in an annular radial face 23. An elongated boss 24 disposed along the axis of the wheel 10 is formed integrally with the end wall 21ᵃ and projects outwardly beyond the opposite sides thereof. An axle 25 of the vehicle is received in an axial bore 26 in the boss 24 to journal the wheel 10 on the toy.

To aid in creating the appearance of an actual wheel, the profile of the hub 11, the spoke portion 12, the tire side wall 16', and the tire tread 15 are formed in the member 21. The latter portion 15 is formed on the cylindrical wall 21ᵇ of the member 21 and is separated from from the tire side wall 16' by the bead 17' extending outwardly from the end wall 21ᵇ. An annular flange 28 projects axially from the face 23 on the cylindrical wall and is disposed radially inwardly from the outer periphery of the face and concentric with the axis of the wheel 10.

The outer member 22 of the wheel 10 comprises an annular cylinder 22ᵃ defining an axial bore 29. At one end, the outer periphery of the cylinder is of the same diameter as the periphery of the cylindrical wall 21ᵇ on the inner member 21. The wall of the cylinder is rounded toward the opposite end and formed to resemble half of the tread 15 of the tire 14. The larger end of the cylinder terminates in a radial face 30 which abuts the face 23 on the cylindrical wall of the member 21 when the wheel 10 is assembled. An annular groove 31 is formed in the radial face 30 which groove receives the flange 28 whereby the flange and the groove constitute a locating means for holding the two wheel parts 21 and 22 in alinement.

To hold the two members 21 and 22 together when the wheel 10 is assembled, a locking means is formed on the members to act between the groove 31 and the flange 28 to hold the latter in the groove. Herein, the locking means means comprises oppositely directed radial ridges 32 and 33 on the flange 28 and on a side wall of the groove 31. An outwardly directed ridge 32 is formed on the outer end of the flange 28 which ridge, when the wheel is assembled, is disposed behind an inwardly directed ridge 33 on the outer wall of the groove 31. Either the flange 28 or the side walls of the groove 31 is resilient and yields to permit the ridges 32 and 33 to slide past one another as the two members 21 and 22 are pressed together and to snap back into locking engagement to hold the members together with the radial faces 23 and 30 in abutting engagement. Preferably, both of the members 21 and 22 are molded from a resilient materal such as polyethylene plastic or the like which is rubber-like in appearance and characteristics.

As noted above, the outer tire side wall 16 of the wheel 10 and the wheel cover 18 are separate parts and are clamped in their respective positions when the two wheel members 21 and 22 are snapped together. In the illustrated wheel, the outer side wall 16 is formed of a white plastic and the wheel cover disk 18 is stamped from a bright plated metal to resemble the covers in common use on conventional wheels.

The outer side wall 16 and the wheel cover disk 18 are positioned in their proper places relative to each other and to the wheel 10 by locating means formed on the parts. To this end, the outer side wall 16 consists of an annular ring having inner and outer radial faces or walls 16ᵃ and 16ᵇ (FIG. 1). This ring is snugly received in the bore 29 of the outer member 22 and abuts an inwardly directed radial flange 34 integral with the outer end of the bore. The outer wall 16ᵇ of the side wall 16 is convex to resemble the side wall of an inflated tire. The outer margin of the side wall 16 is offset inwardly thus providing a flange 35 disposed in a radial plane to abut the flange 34 and a shoulder 36 abutting the inner periphery of the flange 34.

To hold the side wall 16 outwardly against the flange 34, a series of angularly spaced lugs 37 are formed on the end wall of the inner member to project into the dish-shaped inner member 21 and thus to engage the inner wall 16ᵃ of the side wall 16 when the wheel 10 is assembled. Herein, the lugs 37 are upstanding from ribs 38 radiating from the boss 24 to the cylindrical wall of the inner member 21 to brace and add rigidity to the latter. The lugs 37 are formed on the ribs 38 intermediate the boss 24 and the cylindrical wall and are equally spaced radially from the boss.

In the assembled wheel, the wheel cover 18 is disposed in the center of the side wall 16 with its outer periphery disposed behind the side wall. In order to hold the cover 18 in its proper position and to prevent shifting thereof relative to the side wall 16, a plurality of laterally projecting fingers 39 are fixed to the inner wall 16ᵃ of the side wall. The fingers 39 are angularly spaced around the side wall 16 to define a circle having a diameter slightly less than the diameter of the cover 18. Thus, as the cover 18 is pressed between the fingers 39 the latter yield and resiliently grip the periphery of the cover to hold it in place.

The cover disk 18 may be stamped into a number of forms which would resemble a conventional wheel and hub cap. Herein, a circumferential radial flange 40 extends under the side wall 16 and an outwardly directed bead 41 engages the inner periphery of the side wall to simulate a rim on which the tire is mounted. The radial flange 40 is clamped between the side wall 16 and the lugs 37 when the outer member 22 is snapped into the assembled position. The wall 16ᵃ of the side wall 16 is offset as at 42 to receive the flange 40. The remainder of the cover is generally bowed outwardly to resemble an automobile hub cap.

In assembling the wheel 10 on the toy vehicle, the inner member 21 is telescoped on the axle 25 of the wheel with the axle projecting through the bore 26 in the boss 24. The outer end of the axle is enlarged as by riveting or the like to prevent removal of the wheel. The wheel cover 18 is pressed between the fingers 39 on the side wall 16 and the latter inserted in the bore 29 of the member 22 to abut the flange 34. The outer member 22 is then pressed onto the inner member 21 with the locking means snapping into place to prevent accidental separation of the members.

It will be apparent that the toy wheel described above may be simply made and assembled while still having a realistic appearance as a commercial wheel and tire. When the wheel is assembled on the toy, the axle does not protrude through the wheel and thus the outer face of the latter remains unbroken. All parts of the wheel are securely locked together by a relatively simple assembly procedure comprising merely fitting the parts in place and pressing them together.

I claim as my invention:

1. In a wheel for a toy vehicle, the combination of, a dish-shaped inner wheel member having a hub portion, a wheel portion and a concentric tire portion comprising an axially extending cylindrical wall, an annular flange formed on said inner member concentric with said cylindrical wall and spaced radially inwardly from the outer periphery thereof and projecting axially beyond the wall, a plurality of ribs formed in said inner member and radiating outwardly from said hub portion, an axially projecting lug formed on each rib, an annular ring having inner and outer radial walls, a series of laterally projecting angularly spaced fingers formed on one of said radial walls and equally spaced radially from the inner periphery of the ring, a disk disposed between said fingers, a cylindrical outer wheel member defining an axial bore to receive said annular ring and said disk, an inwardly extending radial flange formed around said bore adjacent one end of said outer member to abut the other of said radial walls, an annular groove formed in the opposite end of said outer member and adapted to receive said annular flange on said inner member with said opposite end of the outer member abutting said cylindrical wall on the inner member, and locking means acting between said flange and said groove to hold said inner and outer members together with said disk and said ring clamped therebetween.

2. In a wheel for a toy vehicle, the combination of, a dish-shaped inner wheel member having an end wall and a cylindrical wall terminating in a radial face, an annular flange projecting axially from said face and radially spaced inwardly from the outer periphery of the face, a plurality of lugs formed on said end wall to project axially into said member and terminating in a plane parallel to and spaced outwardly from said face, an annular ring concentric with said member and having inner and outer radial walls, said inner wall abutting said lugs, a plurality of fingers angularly spaced around said ring and projecting into said inner member, a disk disposed concentric to said inner member with the outer periphery of the disk abutting said fingers whereby the latter provide at least three points of support angularly spaced around the disk, a cylindrical outer member having an axial bore adapted to receive said ring, an inwardly extending radial flange formed at one end of said bore to abut said outer wall, said outer member having an axially opening groove formed in the end thereof opposite said radial face to receive said annular flange with the end of the outer member abutting said radial face, and locking means acting between said groove and said annular flange to hold the latter in the groove.

3. In a wheel for a toy vehicle, the combination of, a dish-shaped inner member having an end wall and a cylindrical wall terminating in a radial face, an annular flange formed on said radial face to project axially therefrom and being spaced radially inwardly from the outer periphery of the face, a plurality of lugs formed on said end wall to project axially into said member and angularly spaced apart, a disk abutting said lugs, an annular ring concentric with said inner member and overlying the outer periphery of said disk to hold the latter against said lugs, an outer member having an axial bore adapted to receive said ring, an inwardly directed radial flange formed at one end of said bore to abut a wall of said ring, said outer member having an axially opening annular groove formed in the end opposite said radial flange and adapted to receive said annular flange with the end of the outer member abutting said face, and locking means formed on said inner and outer members to hold the latter together.

4. A wheel for a toy vehicle comprising an inner member having a cylindrical peripheral wall and an inner end wall extending radially inwardly from one end of said cylindrical wall, said cylindrical wall terminating at the other end in a radial face, an outer member having a cylindrical peripheral wall terminating at one end in a radial face abutting against said first-mentioned face, an outer end wall comprising a ring secured to and extending radially inwardly from the other end of said outer member and formed with an axial bore concentric with said cylindrical walls, a cover telescoped into and closing the outer end of said bore, means on said ring and said inner member abutting against opposite sides of said cover to prevent axial shifting of the latter relative to said ring when said faces are in contact, and means on said members for holding said faces together.

5. A wheel as defined in claim 4 in which said holding means comprises an annular flange extending axially from one of said faces and into an axially opening groove in the other of said faces, and interlocking ridges on said flange and in said groove for preventing axial separation thereof.

6. A wheel as defined in claim 4 in which said abutting means comprises lugs extending axially between said inner end wall and the inner side of said cover, and a flange extending radially inwardly from the outer end of said bore to abut against the outer side of said cover.

7. A wheel for a toy vehicle comprising an inner member having a cylindrical peripheral wall and an inner end wall extending radially inwardly from one end of said cylindrical wall, said cylindrical wall terminating at the other end in a radial face, an outer member having a cylindrical peripheral wall terminating at one end in a radial face abutting against said first-mentioned face, a ring telescoped into said outer member and having inner and outer radial walls, a disc telescoped into said ring, means for holding said disc against shifting axially outwardly relative to said ring and said ring against shifting axially relative to said outer member, means acting between said inner member and said disc to block movement of the latter axially inwardly when said faces are in contact, and means on said members for holding said faces together.

8. A wheel as defined in claim 7 in which said means holding said disc and said ring against shifting axially inwardly comprise an annular flange extending radially inwardly from said outer member to abut against said outer wall of said ring, an annular flange extending radially outwardly from said disc to abut against said inner wall of said ring, and a plurality of axially extending lugs abutting at one end against said inner end wall and at the other end against said disc.

References Cited in the file of this patent

UNITED STATES PATENTS

| | | | |
|---|---|---|---|
| 562,723 | Gruttner | June 23, | 1896 |
| 1,021,307 | Fleming | Mar. 26, | 1912 |

FOREIGN PATENTS

| | | | |
|---|---|---|---|
| 875,022 | Germany | Apr. 30, | 1953 |
| 1,007,671 | France | Feb. 13, | 1952 |
| 1,047,090 | Germany | Dec. 18, | 1958 |